(12) United States Patent
Narayanan et al.

(10) Patent No.: US 7,847,203 B2
(45) Date of Patent: Dec. 7, 2010

(54) SYSTEM AND METHOD FOR INDICATING A POSITION OF AN ELECTRICAL DISTRIBUTION DEVICE

(75) Inventors: Janakiraman Narayanan, Andra Pradesh (IN); Soundararajan Narayanasamy, Hyderabad (IN); Partha Sarathy Doddapadam Srinivasa Raghavachar, Karnataka (IN); Wolfgang Meyer-Haack, Neumunster (DE)

(73) Assignee: General Electric Company, Schenectady, NY (US)

( * ) Notice: Subject to any disclaimer, the term of this patent is extended or adjusted under 35 U.S.C. 154(b) by 263 days.

(21) Appl. No.: 12/103,067

(22) Filed: Apr. 15, 2008

(65) Prior Publication Data

US 2009/0255791 A1 Oct. 15, 2009

(51) Int. Cl.
*H01H 9/20* (2006.01)
(52) U.S. Cl. .................................. 200/50.26; 200/400
(58) Field of Classification Search ............. 200/52.26, 200/400, 401
See application file for complete search history.

(56) References Cited

U.S. PATENT DOCUMENTS 4,011,424 A * 3/1977 Ericson et al. .............. 200/308
4,101,744 A * 7/1978 Wilson ..................... 200/50.26
6,080,947 A * 6/2000 Ulerich et al. .............. 200/308
7,470,870 B2 * 12/2008 Schmidt et al. ............. 200/400

* cited by examiner

*Primary Examiner*—Renee S Luebke
*Assistant Examiner*—Lisa Klaus
(74) *Attorney, Agent, or Firm*—Global Patent Operation; Stephen G. Midgley (57) ABSTRACT

A system for indicating a position of an electrical distribution device configured to be racked into an electrically connected condition within an enclosure and racked out to an electrically disconnected condition via a racking mechanism is disclosed. The system includes a rotating indicator having at least a first position and a second position, the first position indicating the connected condition, and the second position indicating the disconnected condition, the indicator operably connected to the racking mechanism to rotate the indicator in response to movement of the racking mechanism between at least the connected condition and the disconnected condition. The system also includes a biasing device to bias rotation of the indicator toward the first position when the racking mechanism is in the connected condition and to bias rotation of the indicator toward the second position when the racking mechanism is in the disconnected condition. The system further includes a first mechanical stop to hold the indicator at the first position when the racking mechanism is in the connected condition, and a second mechanical stop to hold the indicator at the second position when the racking mechanism is in the disconnected condition.

17 Claims, 9 Drawing Sheets

SYSTEM AND METHOD FOR INDICATING A POSITION OF AN ELECTRICAL DISTRIBUTION DEVICE

BACKGROUND OF THE INVENTION

The subject matter disclosed herein relates to electrical distribution equipment and, more particularly, to indicators for electrical distribution devices.

Conventional electrical distribution equipment generally includes one or more circuit breakers, and often includes a plurality of circuit breakers housed in drawout units in switchgear housings and other electrical equipment. Periodically, the circuit breaker drawout units require removal to facilitate maintenance and or replacement of the associated switching devices. In order to facilitate removal, or otherwise to disconnect the circuit breaker from an electrical circuit, the circuit breaker is "racked out", that is, disconnects in the circuit breaker are moved from a connected position to a disconnected position.

Typical circuit breakers have three positions. The first position is a "connected position" in which primary and secondary disconnects of the circuit breaker are connected to a circuit. The second position is a "disconnected position" in which the primary and secondary disconnects are disconnected. The third position is a "test position", in which the primary disconnects are disconnected but the secondary disconnects are connected. The test position allows a user, for example, to check the functioning of secondary or control power. Breakers may be racked between these three positions. When racking out, the breaker is moved from the connected position, through the test position, into the disconnected position.

A racking mechanism is included in conjunction with the circuit breaker, such as a racking shaft, that allows for rotation of the mechanism to move the circuit breaker into the connected position. Indicators of the various positions are provided in conjunction with the racking mechanism, and are generally dependent on the rotation of the racking mechanism to indicate position. However, non-synchronization between the indicator and the racking mechanism may cause the indicator to incorrectly or incompletely indicate the position of the circuit breaker, and thus prove inaccurate in indicating whether the circuit breaker is fully connected or disconnected.

BRIEF DESCRIPTION OF THE INVENTION

A system for indicating a position of an electrical distribution device, configured to be racked into an electrically connected condition within an enclosure and racked out to an electrically disconnected condition via a racking mechanism, constructed in accordance with exemplary embodiments of the invention includes a rotating indicator having at least a first position and a second position, the first position indicating the connected condition, and the second position indicating the disconnected condition, the indicator operably connected to the racking mechanism to rotate the indicator in response to movement of the racking mechanism between at least the connected condition and the disconnected condition. The system also includes a biasing device to bias rotation of the indicator toward the first position when the racking mechanism is in the connected condition and to bias rotation of the indicator toward the second position when the racking mechanism is in the disconnected condition. The system further includes a first mechanical stop to hold the indicator at the first position when the racking mechanism is in the connected condition, and a second mechanical stop to hold the indicator at the second position when the racking mechanism is in the disconnected condition.

Other exemplary embodiments of the invention include a method of indicating a racking position of an electrical distribution device configured to be racked into an electrically connected condition within an enclosure and racked out to an electrically disconnected condition via a racking mechanism. The method includes moving the racking mechanism to move the electrical distribution device between at least the connected condition and the disconnected condition, and transforming translational movement of the racking mechanism to rotational movement of an indicator, the indicator having at least a first position and a second position, the first position indicating the connected condition, and the second position indicating the disconnected condition. The method also includes biasing the indicator to rotate toward the first position when the racking mechanism is in the connected condition, and biasing the indicator to rotate toward the second position when the racking mechanism is in the disconnected condition. The method further includes holding the indicator at the first position when the racking mechanism is in the connected condition, and holding the indicator at the second position when the racking mechanism is in the disconnected condition.

Additional features and advantages are realized through the techniques of exemplary embodiments of the invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

There is provided a system and method for indicating a racking condition or position of an electrical distribution device, such as a circuit breaker. The system includes a rotating mechanical racking indicator that defines disconnected and connected conditions of the circuit breaker positively by the use of a biasing device such as an over center spring connected to the indicator. In an exemplary embodiment, racking positions are traced by a translation mechanism such as an indicator lever which has a cam profile and interacts with a racking mechanism. These positions are displayed on a label or other indication located on the indicator. A mechanical stop is included to define the positions on the indicator and cooperate with the biasing device to clearly indicate disconnected and connected conditions irrespective of lever variations. As used herein, "conditions" of the circuit breaker or other electric distribution devices refer to positions of the device and/or various disconnects in the device that result in various connection conditions, such as the connected, disconnected and test conditions described herein.

Figure 1:
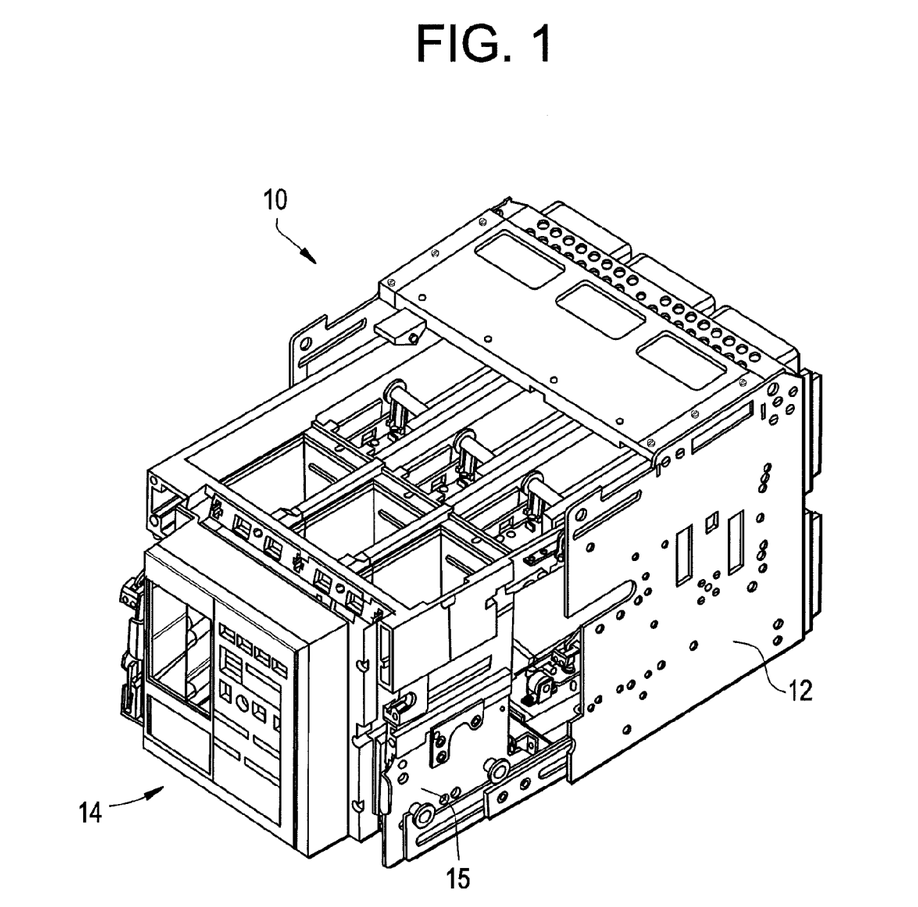
FIG. 1 is a right perspective view of an electrical distribution device assembly illustrating a circuit breaker in accordance with an exemplary embodiment of the invention.

With initial reference to FIG. 1, an electrical distribution device assembly constructed in accordance with an exemplary embodiment of the invention is indicated generally at 10. Electrical distribution device assembly 10 includes a housing or drawout substructure 12. Electrical distribution device assembly 10 further includes an electrical distribution device, shown in the form of a circuit breaker 14, positioned in the drawout substructure 12. In one embodiment, the circuit breaker 14 is housed in a cassette 15. The circuit breaker 14 may be readily installed into the drawout substructure 12 to engage primary and secondary electrical disconnects of the circuit breaker 14.

Figure 2:
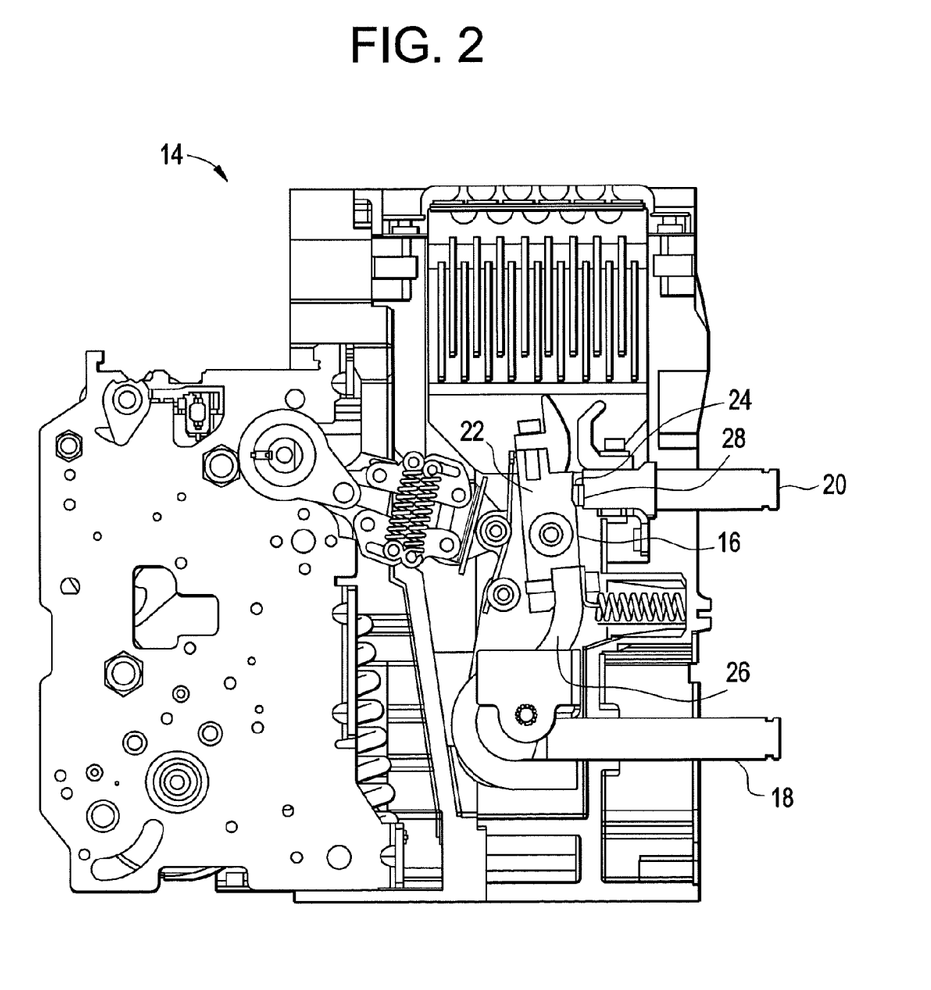
FIG. 2 is a side view of the circuit breaker of FIG. 1.

Referring to FIG. 2, the circuit breaker 14 includes a contact arm assembly 16 mounted therein for operation of the circuit breaker 14. The contact arm assembly 16 includes primary disconnects 18 and 20 and an arm 22 having a movable contact 24 mounted to one end. The arm 22 has a flexible, electrically conductive strap 26, made from braided copper cable for example, attached to the opposite end. A stationary contact 28 is mounted on one end of the primary contact 20. The strap 26 electrically couples the contact arm 22 to the primary contact 20 that allows electrical current to flow through the circuit breaker 14.

Figure 3:
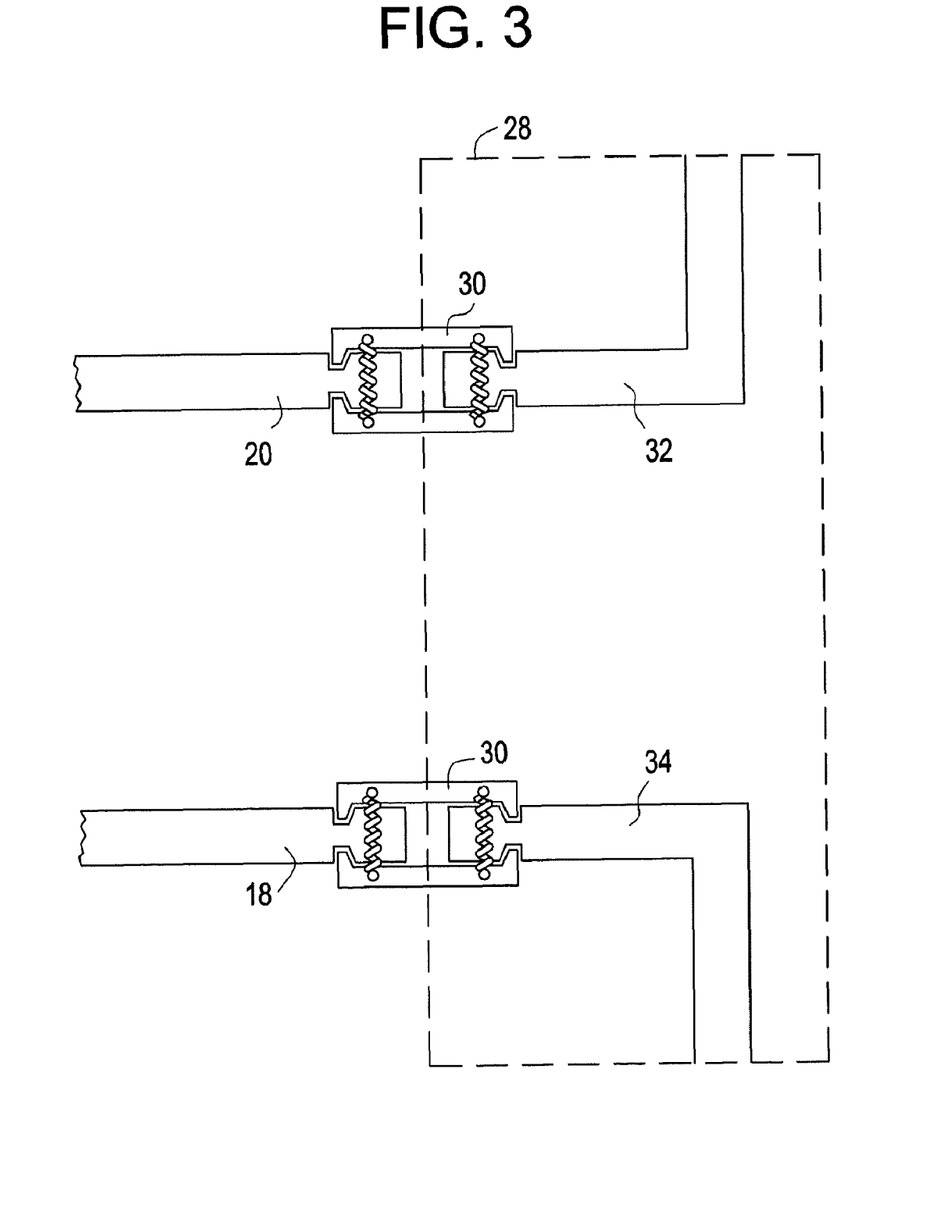
FIG. 3 is a side view of primary disconnects of the circuit breaker of FIG. 1 in a connected condition.
Figure 4:
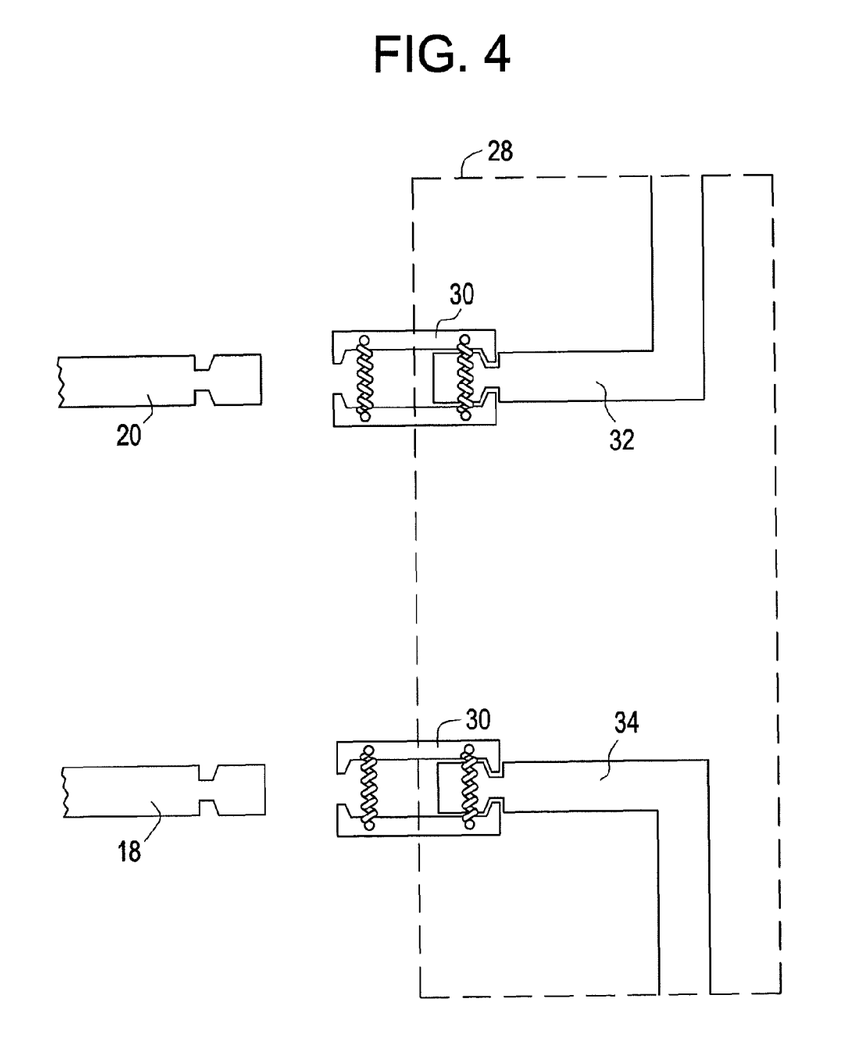
FIG. 4 is a side view of the primary disconnects of the circuit breaker of FIG. 1 in a disconnected condition.

Referring to FIGS. 3-4, the primary disconnects 18, 20 of the circuit breaker 14 are shown when the circuit breaker 14 is in the connected and disconnected conditions. In the connected condition, shown in FIG. 3, the primary disconnects 18, 20 are electrically connected to a circuit 28 via connectors 30. In one embodiment, the connectors 30 are primary disconnect fingers, as known in the art. A portion of the circuit 28 is shown, including an incoming line bus 32 and a load bus 34.

In the disconnected position, shown in FIG. 4, the primary disconnects 18, 20 are moved to disengage the connectors 30, and thereby to electrically disconnect the primary disconnects 18, 20 from the circuit 28. The breaker and connection mechanisms described herein are merely exemplary, and may be of any suitable form and configuration.

Figure 5:
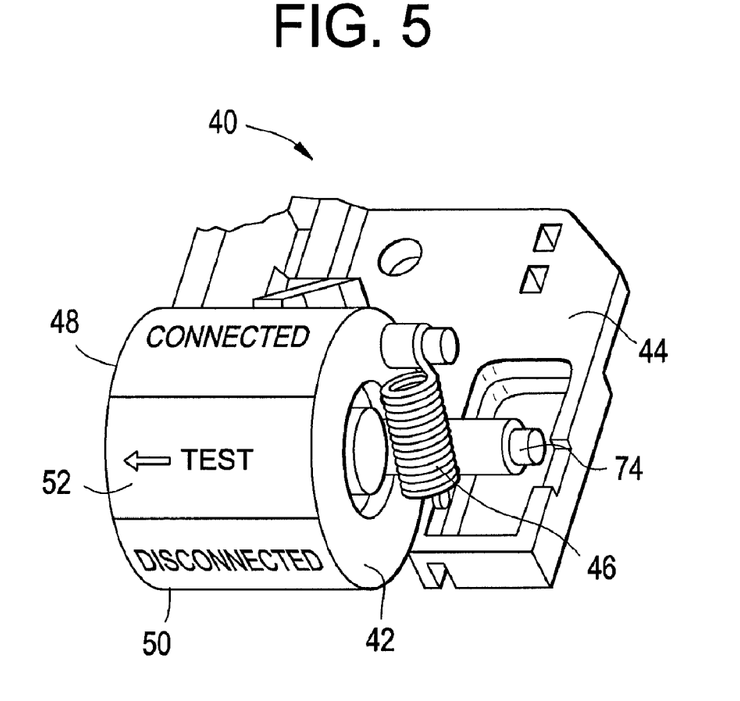
FIG. 5 is a right perspective view of an indicator drum assembly of the electrical distribution device assembly of FIG. 1 in accordance with an exemplary embodiment of the invention.

Referring to FIG. 5, an indicator assembly constructed in accordance with an exemplary embodiment of the invention is indicated generally at 40. The indicator assembly 40 includes an indicator drum 42 mounted on a bracket 44. The indicator drum 42 is rotatable about a central axis. In the current exemplary embodiment, the indicator drum 42 is a cylindrical drum, however the indicator drum 42 may be of any form capable of rotating in response to a change in position of the circuit breaker 14 and/or racking mechanism. A biasing device, such as over center spring 46 is connected to the indicator drum 42 at one end and to the fixed bracket 44 at the other end.

The indicator drum 42 includes a plurality of indicators disposed on the surface of the indicator drum 42. The indicators are located on the surface so that rotation of the indicator drum 42 causes the indicators to move about the axis. In an exemplary embodiment, the indicators include a connected position indicator 48, for indicating that the circuit breaker 14 is in the connected condition in which primary disconnects 18, 20 and secondary disconnects of the circuit breaker are fully engaged. The indicators also include a disconnected position indicator 50, for indicating that the circuit breaker 14 is in the disconnected condition in which the primary disconnects 18, 20 and secondary disconnects are disengaged. In an exemplary embodiment, the indicators also include a test position indicator 52, for indicating that the circuit breaker 14 is in the test condition in which the primary disconnects 18, 20 are disconnected but the secondary disconnects are connected. As the circuit breaker 14 is racked in or out, the indicator drum 42 rotates accordingly.

For example, the indicator drum 42 is located at a first position, that is, to indicate that the circuit breaker 14 is in a connected condition. As the circuit breaker 14 is racked out to a disconnected condition, the indicator drum 42 is rotated toward a second condition, that is, a disconnected position. Also, as the indicator drum 42 rotates between the connected and disconnected positions, it will also rotate through additional positions, such as a test position indicating that the circuit breaker is in a test condition.

In the exemplary embodiment described herein, the electrical distribution device is a circuit breaker. In another exemplary embodiment, the electrical distribution device is a low voltage circuit breaker, such as an air circuit breaker (ACB).

In an exemplary embodiment, the circuit breaker 14 includes various components such as any number of primary and secondary disconnects, a breaker locking mechanism and a trip unit.

In another exemplary embodiment, the circuit breaker 14 may be incorporated into the cassette 15 or other assembly. The cassette 15 and/or circuit breaker 14 may be included with suitable electrical equipment and/or incorporated into a suitable switchgear housing that houses the cassette 15 and any other suitable electrical devices, such as various switches and additional circuit breakers. In an exemplary embodiment, the cassette 15 is incorporated in a drawout unit, which allows for removal of the circuit breaker 14 or other switching device as desired, for example, to facilitate maintenance or replacement of a switching device.

Figure 6:
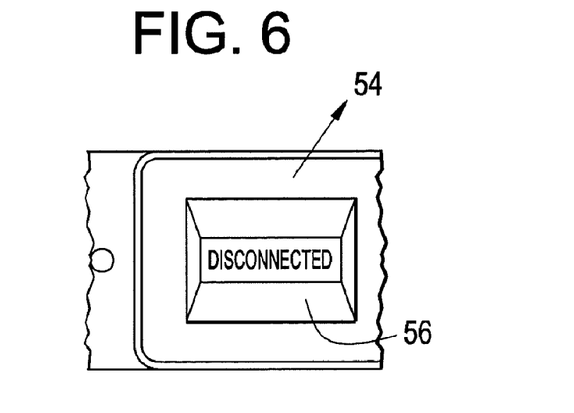
FIG. 6 is a front view of a portion of a circuit breaker cassette.

Referring to FIG. 6, the indicator drum assembly 40, in an exemplary embodiment, is disposed in the cassette 15 or other housing. The cassette 15 includes a front panel 54 that in turn includes a display opening 56. The display opening 56 exposes one of the indicators depending on the position of the indicator drum 42. In the exemplary embodiment shown in FIGS. 5-7, the indicator drum 42 is in the disconnected position, and the disconnected position indicator 50 is accordingly exposed through the display opening 56.

Referring again to FIG. 5, the over center spring 46 is connected to the indicator drum 42 at one end and to the fixed bracket 44 at the other end.

Figure 7:
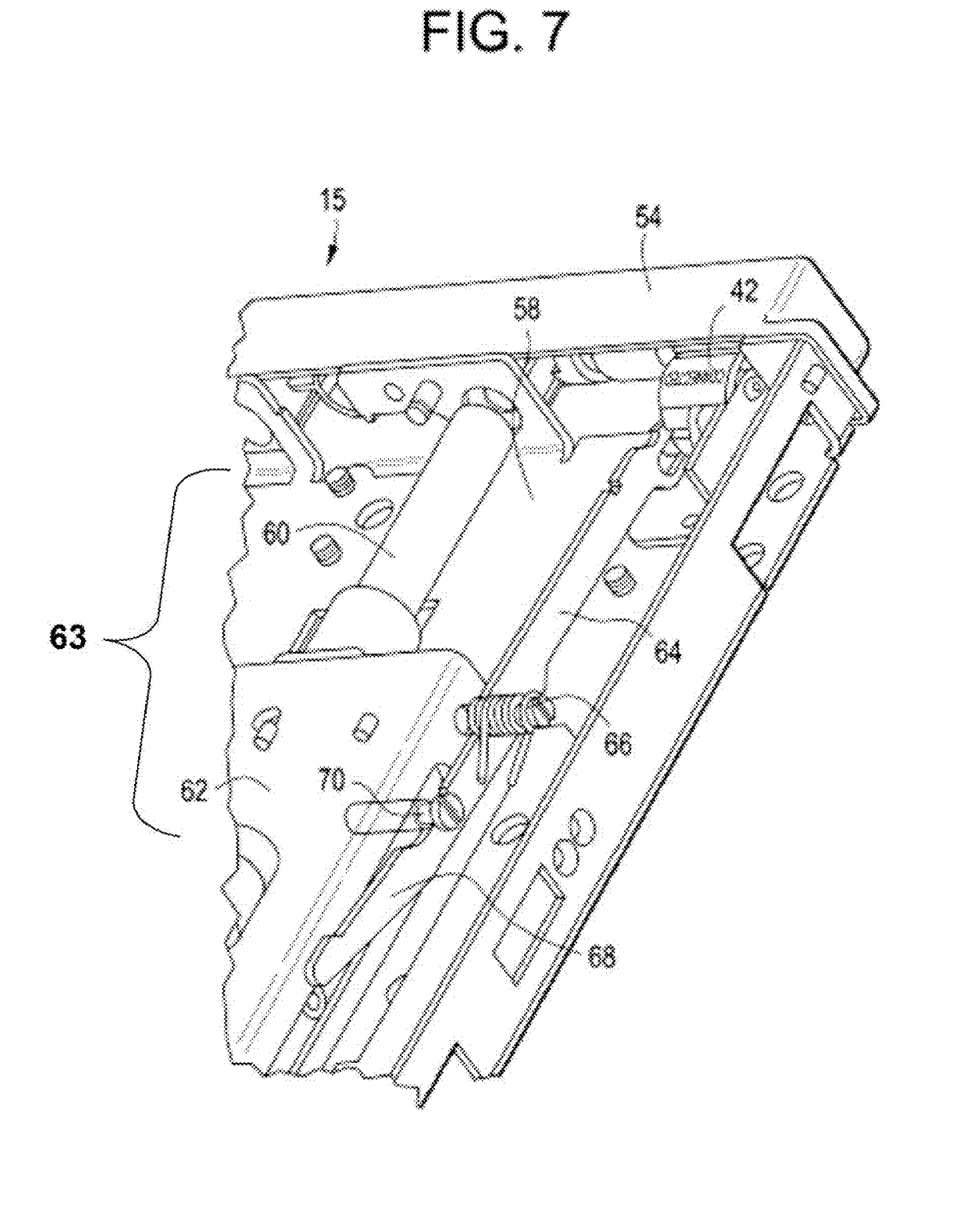
FIG. 7 is a perspective view of a portion of a circuit breaker cassette including a racking mechanism and the indicator assembly of FIG. 5.

Referring to FIG. 7, a portion of the cassette 15 is shown that houses the indicator assembly 40, a racking mechanism in operable communication with the indicator assembly 40, and a base assembly 58 upon which the indicator assembly 40 and the racking mechanism are mounted.

In an exemplary embodiment, the racking mechanism 63 includes a racking shaft 60 and a screw block 62. The racking shaft 60 is coupled to the screw block 62 which includes a lead screw (not shown). The racking shaft 60 is rotatably coupled to the lead screw. For example, the racking shaft 60 includes a male thread and the lead screw includes a female thread. Threads in the racking shaft 60 engage corresponding threads on the lead screw of the screw block 62, so that rotation of the racking shaft 60 imparts linear movement to the screw block 62. The linear movement of the screw block 62 in turn imparts movement to the primary disconnects 18, 20 and secondary disconnects of the circuit breaker 14 to move the circuit breaker 14 between the connected and disconnected conditions.

In an exemplary embodiment, the cassette 15 includes a translation mechanism such as a lever connector to translate the linear movement of the screw block 62 to rotational movement of the indicator drum 42. The lever connector includes a lever 64 that is mounted on and is rotatable about a pivot pin 66. The lever 64 includes a cam groove 68 that has a cam profile sufficient to cause rotational movement of the lever 64. A cam pin 70 extends from the screw block 62 and moves linearly along with the screw block 62. Movement of the cam pin 70 along the cam groove 68 causes the lever 64 to rotate about the pivot pin 66.

At another end of the lever 64 is a slot 72 that is coupled to the indicator drum 42 via a suitable pin 74 (shown in FIG. 9) or other protrusion. Rotation of the lever 64 in turn causes the indicator drum 42 to rotate about the drum's axis.

These embodiments are merely exemplary, as any mechanism for moving the circuit breaker disconnects between the connected and disconnected positions may be used. Furthermore, the lever 64 described herein is exemplary, as any suitable configuration for imparting rotational movement to the indicator drum 42 may be used.

Referring to FIGS. 8-11, in an exemplary embodiment, the bracket 44 further includes mechanical stops 76 and 78 that are positioned to cooperate with the over center spring 46 to bias the indicator drum 42 to the disconnected position and connected position, respectively. The mechanical stops 76, 78 may be of any suitable shape to cause the drum 42 to stop rotating at the selected position. For example, the mechanical stops 76, 78 may include rigid or resilient protrusions extending from the bracket 44 and cooperating with corresponding depressions or groove(s) in the indicator drum 42. In the exemplary embodiment described herein, the mechanical stops 76, 78 are disposed on the bracket 44. However, the stops may also be disposed on the indicator drum 42.

Figure 8:
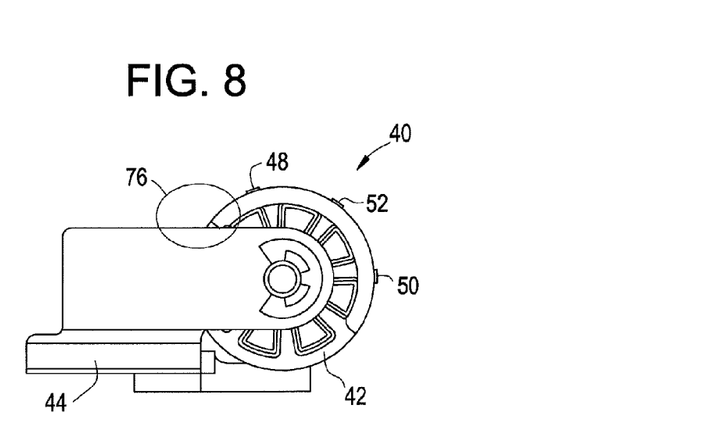
FIG. 8 is a side view of the indicator drum assembly of FIG. 5 in a disconnected position.
Figure 9:
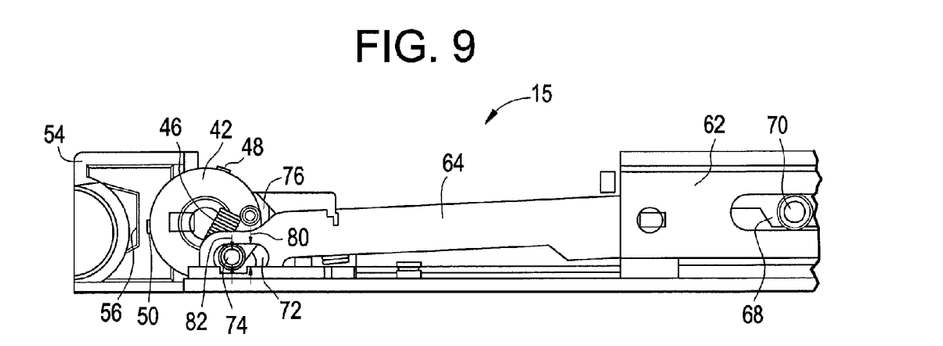
FIG. 9 is side view of a portion of a circuit breaker cassette illustrating the indicator drum assembly of FIG. 5 in a disconnected position.

Referring to FIGS. 8 and 9, the indicator drum 42 is shown in the disconnected position, with the over center spring 46 applying tension toward the disconnected position (for example, in a counterclockwise direction relative to FIG. 8, and a clockwise direction relative to FIG. 9), and the mechanical stop 76 preventing further rotation and accordingly holding the indicator drum 42 at the disconnected display position. Movement of the circuit breaker 14 from the disconnected condition toward the connected condition causes the lever 64 to counteract the tension of the spring 46, and rotate the indicator drum 42 toward the connected position. The force of the over center spring 46 increases as the drum 42 rotates, until the over center spring 46 is stressed to an over center or mid-center condition, and the over center spring 46 thereafter exerts a force causing the drum 42 to rotate toward the connected display position. As the lever 64 moves to the connected position, the over center spring 46 exerts a force on the drum 42 to bias the drum 42 toward the mechanical stop 78, thereby holding the drum 42 in the connected display position.

Figure 10:
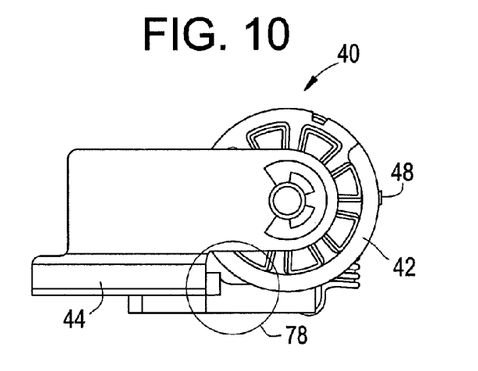
FIG. 10 is a side view of the indicator drum assembly of FIG. 5 in a connected position.
Figure 11:
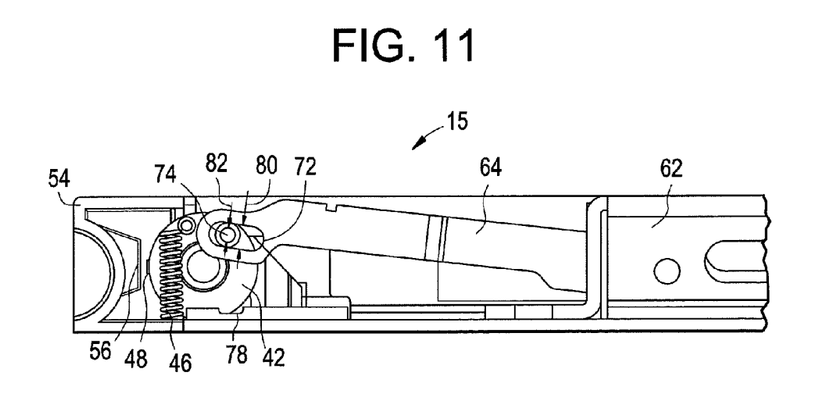
FIG. 11 is side view of a portion of a circuit breaker cassette illustrating the indicator drum assembly of FIG. 5 in a connected position.

Referring to FIGS. 10 and 11, the indicator drum 42 is shown in the connected position, with the drum 42 biased by the over center spring 46 and held in position by the mechanical stop 78.

Referring to FIGS. 9 and 11, in one embodiment, the slot 72 defines a first width 80 and the pin 74 defines a second width 82 that is less than the first width 80, and in turn defines a clearance between the slot 72 and the pin 74 when the indicator drum 42 is in either the connected or disconnected position. In one example, the second width is defined by a diameter of the pin 74. This clearance amount is defined by a difference between the first width 80 and the second width 82, and may be any suitable difference. This difference allows the over center spring 46 and the mechanical stops 76, 78 to maintain the indicator drum 42 exactly in either the connected or disconnected position irrespective of variations of the lever 64 within the clearance range. When the circuit breaker 14 is moved between the connected and disconnected conditions, the lever 64 moves beyond the clearance described herein. Accordingly, the lever 64 engages the pin 74 and causes the indicator drum to rotate. Thus, when the circuit breaker 14 is in a connected or disconnected condition, the drum 42 is maintained exactly in a respective position (independent of variations of the lever 64), and when the circuit breaker 14 is moved between the connected and disconnected conditions, the drum 42 is moved by the lever 64. In one embodiment, the second width 82 is substantially less than the first width 80, that is, the difference between the second width 82 and the first width 80 is greater than any difference in width resulting from normal manufacturing tolerances that are provided, for example, to prevent binding.

Accordingly, in either the connected or disconnected position, the drum 42 is held in the respective display position due to the forces of the spring 46 and the mechanical stop 76 or 78, and independently of lever variations, which could cause changes in the position of the drum 42 and consequently affect the clarity of the indicator. Thus, a clear indication of the connected/disconnected position is ensured, and the possibility of an unclear display due to discrepancies between the lever and drum is eliminated.

Figure 12:
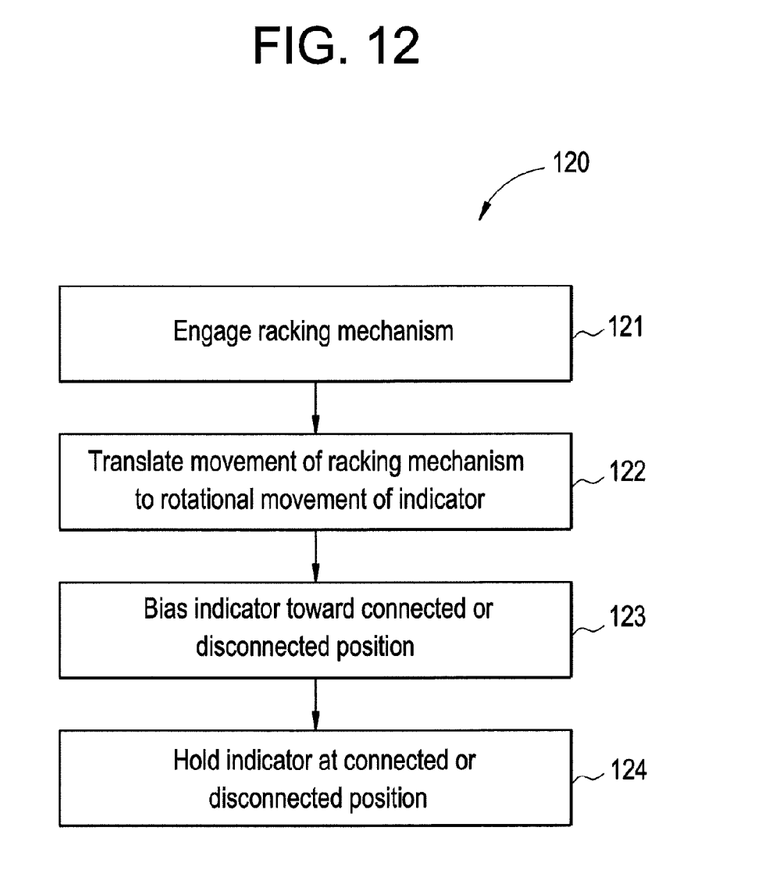
FIG. 12 is a flow chart providing an exemplary method for indicating a racking position of an electrical distribution device.

FIG. 12 illustrates an exemplary method 120 for indicating a racking position of an electrical distribution device, such as a circuit breaker. The method 120 includes one or more stages 121, 122, 123 and 124. In an exemplary embodiment, the method includes the execution of all of stages 121, 122, 123 and 124 in the order described. However, certain stages may be omitted, stages may be added, or the order of the stages changed.

In the first stage 121, the racking mechanism is engaged to move the circuit breaker 14 between a connected and a disconnected condition. This is accomplished, for example, by rotating the racking shaft 60 and in turn causing linear movement of the screw block 62.

In the second stage 122, the movement of the racking mechanism is translated to rotational movement of the indicator drum 42, which rotates in response to the racking mechanism between at least the connected position and the disconnected position. In one example, the movement is translated by rotating the lever 64 in response to the screw block 62, and in turn rotating the indicator drum 42 via the slot 72.

In the third stage 123, when the racking mechanism is in the connected condition or the disconnected condition, the indicator drum 42 is biased toward the connected position or the disconnected position, respectively. This is accomplished, for example, by connecting the over center spring 46 to the indicator drum 42, which exerts a biasing force on the indicator drum 42 toward either the connected or disconnected position.

In the fourth stage 124, the indicator drum 42 is held in place in the connected or disconnected position when the racking mechanism is in the connected or disconnected condition, respectively. In one example, the mechanical stop 76 or 78 holds the indicator drum 42 in place against the biasing force of the over center spring 46. In this way, the over center spring 46 and the mechanical stop 76 or 78 cooperate to hold the indicator drum 42 in either the connected or disconnected position independent of the lever 64.

The system and method described herein provide numerous advantages over prior art systems. Because the indicator is biased toward either the connected or disconnected display positions, the indicator is assured to positively indicate the position. This is in contrast with prior art systems that rely purely on the rotation of the lever, for example, and thus may not fully rotate the indicator to clearly indicate the position. The system and method described herein is also insensitive towards manufacturing variations, as the positions are determined by the mechanical stops which can be designed to indicate a position only when the position is actually reached.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the invention if they have structural elements that do not differ from the literal language of the claims, or if they include equivalent structural elements with insubstantial differences from the literal language of the claims.

The invention claimed is:

1. A system for indicating a position of an electrical distribution device configured to be racked into an electrically connected condition within an enclosure and racked out to an electrically disconnected condition via a racking mechanism, the system comprising:

a rotating indicator having at least a first position and a second position, the first position indicating the connected condition, and the second position indicating the disconnected condition, the indicator operably connected to the racking mechanism to rotate the indicator in response to movement of the racking mechanism between at least the connected condition and the disconnected condition;

a biasing device to bias rotation of the indicator toward the first position when the racking mechanism is in the connected condition and to bias rotation of the indicator toward the second position when the racking mechanism is in the disconnected condition; and a first mechanical stop to hold the indicator at the first position when the racking mechanism is in the connected condition, and a second mechanical stop to hold the indicator at the second position when the racking mechanism is in the disconnected condition;

a translation mechanism to translate movement of the racking mechanism to rotational movement of the indicator; and wherein the translation mechanism includes a cam pin operably connected to the racking mechanism and a lever operably connected to the cam pin and the indicator.

2. The system of claim 1, wherein the biasing device cooperates with the first mechanical stop to hold the indicator at the first position and cooperates with the second mechanical stop to hold the indicator at the second position independent of the translation mechanism.

3. The system of claim 1, wherein the lever includes a slot operably connected to a protrusion on the rotating indicator, the slot having a first width and the protrusion having a second width that is less than the first width.

4. The system of claim 1, wherein the indicator has one or more positions between the first and second positions, and movement of the indicator to the one or more positions is dependent on movement of the translation mechanism.

5. The system of claim 1, wherein the electrical distribution device is selected from at least one of a circuit breaker and a low voltage circuit breaker.

6. The system of claim 1, wherein the electrical distribution device is a circuit breaker, the connected condition is a position in which primary and secondary disconnects of the circuit breaker are connected to a circuit, and the disconnected condition is a position in which the primary and secondary disconnects are disconnected from the circuit.

7. A system for indicating a position of an electrical distribution device configured to be racked into an electrically connected condition within an enclosure and racked out to an electrically disconnected condition via a racking mechanism, the system comprising:

a rotating indicator having at least a first position and a second position, the first position indicating the connected condition, and the second position indicating the disconnected condition, the indicator operably connected to the racking mechanism to rotate the indicator in response to movement of the racking mechanism between at least the connected condition and the disconnected condition;

a biasing device to bias rotation of the indicator toward the first position when the racking mechanism is in the connected condition and to bias rotation of the indicator toward the second position when the racking mechanism is in the disconnected condition; and a first mechanical stop to hold the indicator at the first position when the racking mechanism is in the connected condition, and a second mechanical stop to hold the indicator at the second position when the racking mechanism is in the disconnected condition, wherein the rotating indicator is a cylindrical drum.

8. A system for indicating a position of an electrical distribution device configured to be racked into an electrically connected condition within an enclosure and racked out to an electrically disconnected condition via a racking mechanism, the system comprising:

a rotating indicator having at least a first position and a second position, the first position indicating the connected condition, and the second position indicating the disconnected condition, the indicator operably connected to the racking mechanism to rotate the indicator in response to movement of the racking mechanism between at least the connected condition and the disconnected condition;

a biasing device to bias rotation of the indicator toward the first position when the racking mechanism is in the connected condition and to bias rotation of the indicator toward the second position when the racking mechanism is in the disconnected condition; and a first mechanical stop to hold the indicator at the first position when the racking mechanism is in the connected condition, and a second mechanical stop to hold the indicator at the second position when the racking mechanism is in the disconnected condition, wherein the racking mechanism includes a rotating racking shaft coupled to a lead screw, the lead screw causing linear movement between at least the connected condition and the disconnected condition.

9. A system for indicating a position of an electrical distribution device configured to be racked into an electrically connected condition within an enclosure and racked out to an electrically disconnected condition via a racking mechanism, the system comprising:

a rotating indicator having at least a first position and a second position, the first position indicating the connected condition, and the second position indicating the disconnected condition, the indicator operably connected to the racking mechanism to rotate the indicator in response to movement of the racking mechanism between at least the connected condition and the disconnected condition;

a biasing device to bias rotation of the indicator toward the first position when the racking mechanism is in the connected condition and to bias rotation of the indicator toward the second position when the racking mechanism is in the disconnected condition; and a first mechanical stop to hold the indicator at the first position when the racking mechanism is in the connected condition, and a second mechanical stop to hold the indicator at the second position when the racking mechanism is in the disconnected condition;

wherein the biasing device is an over center spring connected to the indicator.

10. A method of indicating a position of an electrical distribution device configured to be racked into an electrically connected condition within an enclosure and racked out to an electrically disconnected condition via a racking mechanism, the method comprising:

moving the racking mechanism to move the electrical distribution device between at least the connected condition and the disconnected condition;

transforming translational movement of the racking mechanism to rotational movement of an indicator, the indicator having at least a first position and a second position, the first position indicating the connected condition, and the second position indicating the disconnected condition, biasing the indicator to rotate toward the first position when the racking mechanism is in the connected condition, and biasing the indicator to rotate toward the second position when the racking mechanism is in the disconnected condition; and holding the indicator at the first position when the racking mechanism is in the connected condition, and holding the indicator at the second position when the racking mechanism is in the disconnected condition; and wherein translation includes rotating a lever in response to the movement of the racking mechanism, the lever is operably connected to a cam pin and the indicator, and the cam pin is connected to the racking mechanism.

11. The method of claim 10, wherein the indicator is held at the first position when the racking mechanism is in the connected condition, and is held at the second position independent of the translation.

12. The method of claim 10, wherein the indicator has one or more positions between the first and second positions, and movement of the indicator to the one or more positions is dependent on the translation.

13. The method of claim 10 wherein the electrical distribution device is selected from at least one of a circuit breaker and a low voltage circuit breaker.

14. The method of claim 10, wherein the electrical distribution device is a circuit breaker, the connected condition is a position in which primary and secondary disconnects of the circuit breaker are connected to a circuit, and the disconnected condition is a position in which the primary and secondary disconnects are disconnected from the circuit.

15. A method of indicating a position of an electrical distribution device configured to be racked into an electrically connected condition within an enclosure and racked out to an electrically disconnected condition via a racking mechanism, the method comprising:

moving the racking mechanism to move the electrical distribution device between at least the connected condition and the disconnected condition;

transforming translational movement of the racking mechanism to rotational movement of an indicator, the indicator having at least a first position and a second position, the first position indicating the connected condition, and the second position indicating the disconnected condition, biasing the indicator to rotate toward the first position when the racking mechanism is in the connected condition and biasing the indicator to rotate toward the second position when the racking mechanism is in the disconnected condition; and holding the indicator at the first position when the racking mechanism is in the connected condition, and holding the indicator at the second position when the racking mechanism is in the disconnected condition, wherein the indicator is a cylindrical drum.

16. A method of indicating a position of an electrical distribution device configured to be racked into an electrically connected condition within an enclosure and racked out to an electrically disconnected condition via a racking mechanism, the method comprising:

moving the racking mechanism to move the electrical distribution device between at least the connected condition and the disconnected condition;

transforming translational movement of the racking mechanism to rotational movement of an indicator, the indicator having at least a first position and a second position, the first position indicating the connected condition, and the second position indicating the disconnected condition, biasing the indicator to rotate toward the first position when the racking mechanism is in the connected condition, and biasing the indicator to rotate toward the second position when the racking mechanism is in the disconnected condition; and holding the indicator at the first position when the racking mechanism is in the connected condition, and holding the indicator at the second position when the racking mechanism is in the disconnected condition, wherein moving the racking mechanism includes rotating a racking shaft coupled to a lead screw.

17. A method of indicating a position of an electrical distribution device configured to be racked into an electrically connected condition within an enclosure and racked out to an electrically disconnected condition via a racking mechanism, the method comprising:

moving the racking mechanism to move the electrical distribution device between at least the connected condition and the disconnected condition;

transforming translational movement of the racking mechanism to rotational movement of an indicator, the indicator having at least a first position and a second position, the first position indicating the connected condition, and the second position indicating the disconnected condition, biasing the indicator to rotate toward the first position when the racking mechanism is in the connected condition, and biasing the indicator to rotate toward the second position when the racking mechanism is in the disconnected condition; and holding the indicator at the first position when the racking mechanism is in the connected condition, and holding the indicator at the second position when the racking mechanism is in the disconnected condition, wherein biasing includes connecting an over center spring to the indicator.

* * * * *

UNITED STATES PATENT AND TRADEMARK OFFICE
CERTIFICATE OF CORRECTION

PATENT NO.         : 7,847,203 B2                                                    Page 1 of 1
APPLICATION NO.    : 12/103067
DATED              : December 7, 2010
INVENTOR(S)        : Narayanan et al.

It is certified that error appears in the above-identified patent and that said Letters Patent is hereby corrected as shown below:

In Column 9, Line 50, in Claim 10, delete "condition," and insert -- condition; --, therefor.

In Column 10, Line 5, in Claim 13, delete "10" and insert -- 10, --, therefor.

In Column 10, Line 29, in Claim 15, delete "condition," and insert -- condition; --, therefor.

In Column 10, Line 31, in Claim 15, delete "condition" and insert -- condition, --, therefor.

In Column 10, Line 54, in Claim 16, delete "condition," and insert -- condition; --, therefor.

In Column 11, Line 13, in Claim 17, delete "condition," and insert -- condition; --, therefor.

Signed and Sealed this
Third Day of May, 2011

David J. Kappos
*Director of the United States Patent and Trademark Office*